Patented Aug. 17, 1943

2,326,984

UNITED STATES PATENT OFFICE 2,326,984

THIURAM SULPHIDES

Andrew Tomlin, Hudson, Ohio, assignor to Monsanto Chemical Company, St. Louis, Mo., a corporation of Delaware No Drawing. Application December 4, 1941, Serial No. 421,694

15 Claims. (Cl. 117—100)

The present invention relates to the production of thiuram sulphides in an innocuous form resistant to dusting or flying.

While thiuram sulphides have been reported to possess marked insolubility in lipoids and therefore non-irritant to the skin (The Jour. of Pharm. and Exper. Therap., vol. XVII, No. 5, p. 354) they do nevertheless bring about marked skin irritation and discomfort to many individuals. Tetramethyl thiuram disulphide is particularly offensive in this respect due no doubt to its relatively high toxicity. As a result the commercial use of thiuram sulphides has in many instances been kept at a minimum, although they are valuable accelerators of the vulcanization of rubber. The fine particle size to which a thiuram sulphide must be reduced in order to provide a form which can be uniformly dispersed in rubber naturally increases the dusting and constitutes a serious health hazard to the workmen.

It is an object of this invention to prepare thiuram sulphides in finely divided form nonirritating to the skin or mucous membrane. A further object is to prepare thiuram sulphides in finely divided form resistant to dusting or flying. A still further object is to provide thiuram sulphides in a form which can be easily and uniformly incorporated into rubber, whether in the form of an aqueous dispersion or in any of the usual forms of crude rubber. Another object is to prepare thiuram sulphides in a form attractive in appearance and agreeable to touch. Another object is to prepare thiuram sulphides in a form which, although finely divided, will not cake or pack in transit. Other objects are to provide new compositions of matter and to advance the art.

In accordance with this invention it has been discovered that these objects may be accomplished by coating the thiuram sulphide in finely divided form with a hydrophobic emulsifiable liquid oil of the long chain aliphatic type. Best results are obtained with a liquid oil which is normally solid at room temperature as for example, paraffin, and the coating operation preferably is carried out in the presence of a wetting agent.

While the coating procedure can be varied to some extent the steps by which the desired composition can be obtained are essentially as follows: The oil in the presence of the wetting agent is emulsified in water. Accordingly it is desirable to employ a substance which liquefies below 100° C. If the oil is normally solid at room temperature it is liquefied either alone or in the presence of the water and then emulsified in the aqueous vehicle. The thiuram sulfide in finely divided form is disseminated throughout the emulsion and the solids filtered off and dried. The individual particles of the thiuram sulphide are left with a thin oil or wax coating which gives them a soft velvety "feel" and renders them nondusting and non-irritating to the skin or mucous membrane. Although the particle size is still small, the product does not pack and cake during transit. The oil or wax coating, in view of the retention of the fine particle size, greatly facilitates the incorporation into rubber. A particularly striking advantage appears when it is desired to disperse the product in an aqueous dispersion of rubber. While the point has not been definitely determined, this may be primarily due to a small proportion of wetting agent retained in the oil or wax coating.

The following examples illustrate the invention in greater detail but are not limitative of the invention.

*Example I*

Substantially 4000 parts by weight of water, 20 parts by weight of paraffin and 5 parts by weight of a 30% aqueous solution of decyl benzene sodium sulphonate were charged into a suitable container and heated to 80–85° C. with rapid and efficient agitation. Substantially 380 parts by weight of finely ground tetramethyl thiuram disulfide were added and the stirring continued until the temperature had dropped to about 35° C. The solids were then filtered off, washed with water and dried at about 50° C. 387 parts by weight of a smooth talclike powder was obtained. This product had little tendency to fly or dust and was noninjurious to workmen. Furthermore, the product could be readily and evenly re-dispersed into an aqueous rubber suspension.

*Example II*

Substantially 1700 to 2100 parts by weight of water were charged into a wooden container of suitable capacity fitted with a high speed stirrer and heated to 90° C. or above, preferably by the introduction of steam. Substantially 15 parts by weight of paraffin and 1.25 parts by weight of decyl benzene sodium sulphonate were added and the charge heated and stirred until a uniform emulsion was produced. Substantially 285 parts by weight of finely ground tetramethyl thiuram disulphide was added and the heating but not the stirring discontinued. Stirring was continued until the temperature of the mixture had dropped to room temperature after which the solids were filtered off, washed with water and dried at 50° C. About 290 parts by weight of smooth dry talclike powder was obtained.

*Example III*

Substantially 8000 parts by weight of water and 40 parts by weight of stearic acid together with a little caustic soda to aid the emulsification were charged into a suitable reactor heated rapidly to 80° and stirred until an emulsion was produced. Substantially 760 parts by weight of tetramethyl thiuram disulphide was added to the emulsion under efficient stirring. Stirring was continued until the temperature had fallen to about 30° C., the solids filtered off and washed and dried. Substantially 783 parts by weight of a dustless innocuous product were obtained.

Of course, the practice of the invention is by no means limited to the oils and waxes enumerated in the specific examples. In general, the protective coating layer can be a mineral oil or a mineral wax, an ester of a higher alcohol as for example, beeswax, carnauba wax and in some instances simply a higher alcohol, a fatty acid such as palmitic acid or a fatty acid ester of a polyhydric alcohol as for example, tristearin. Furthermore, other thiuram sulphides are amenable to the aforementioned treatment as for example tetraethyl thiuram disulphide and monosulphide and tetramethyl thiuram monosulphide. It is evident that many modifications can be made in the process of the specific examples set forth to illustrate the invention. The invention is limited solely by the claims attached hereto as part of the present specification.

What is claimed is:

1. The method of preparing thiuram sulphides in a form resistant to dusting or flying which comprises coating the thiuram sulphide in finely divided form in aqueous suspension with a hydrophobic emulsifiable oil of the long chain aliphatic type, separating the solids from said suspension and drying said solids.

2. The method of preparing thiuram sulphides in a form resistant to dusting or flying which comprises coating the thiuram sulphide in finely divided form in aqueous suspension, in the presence of a wetting agent, with a hydrophobic emulsifiable oil of the long chain aliphatic type, separating the solids from said suspension and drying said solids.

3. The method of preparing tetra alkyl thiuram sulphides in a form resistant to dusting or flying which comprises coating the thiuram sulphide in finely divided form in hot aqueous suspension with a hydrophobic emulsifiable oil of the long chain aliphatic type normally solid at room temperature but liquid at the temperature of the coating bath, cooling the suspension below the solidification temperature of the said oil, separating the solids from said suspension and drying said solids.

4. The method of preparing tetramethyl thiuram disulphide in a form resistant to dusting or flying which comprises coating the thiuram disulphide in finely divided form in hot aqueous suspension with a hydrophobic emulsifiable oil of the long chain aliphatic type normally solid at room temperature but liquid at the temperature of the coating bath, cooling the suspension below the solidification temperature of the said oil, separating the solids from said suspension and drying said solids.

5. The method of preparing tetramethyl thiuram disulphide in a form resistant to dusting or flying which comprises coating the thiuram disulphide in finely divided form in hot aqueous suspension in the presence of a wetting agent with paraffin cooling the suspension below the solidification temperature of the paraffin, separating the solids from the suspension and drying said solids.

6. The method of preparing tetraethyl thiuram disulphide in a form resistant to dusting or flying which comprises coating the thiuram disulphide in finely divided form in hot aqueous suspension in the presence of a wetting agent with paraffin cooling the suspension below the solidification temperature of the paraffin, separating the solids from the suspension and drying said solids.

7. The method of preparing tetramethyl thiuram monosulphide in a form resistant to dusting or flying which comprises coating the thiuram disulphide in finely divided form in hot aqueous suspension in the presence of a wetting agent with paraffin cooling the suspension below the solidification temperature of the paraffin, separating the solids from the suspension and drying said solids.

8. Thiuram sulphides in finely divided form the particles of which are coated with a hydrophobic emulsifiable unctuous coating of the long chain aliphatic type, said sulphide being a smooth, dry, talclike powder.

9. Tetra alkyl thiuram sulphides in finely divided form the particles of which are coated with a hydrophobic emulsifiable unctuous coating of the long chain aliphatic type, said sulphide being a smooth, dry talclike powder.

10. Tetramethyl thiuram disulphide in finely divided form the particles of which are coated with a hydrophobic emulsifiable unctuous coating of the long chain aliphatic type, said disulphide being a smooth, dry, talclike powder.

11. Tetraethyl thiuram disulphide in finely divided form the particles of which are coated with a hydrophobic emulsifiable unctuous coating of the long chain aliphatic type, said disulphide being a smooth, dry, talclike powder.

12. Tetramethyl thiuram monosulphide in finely divided form the particles of which are coated with a hydrophobic emulsifiable unctuous coating of the long chain aliphatic type, said monosulphide being a smooth, dry, talclike powder.

13. Tetramethyl thiuram disulphide in finely divided form the particles of which are coated with paraffin, the coated sulphide being a smooth, dry, talclike powder.

14. Tetramethyl thiuram monosulphide in finely divided form the particles of which are coated with paraffin, the coated sulphide being a smooth, dry, talclike powder.

15. Tetraethyl thiuram disulphide in finely dividede form the particles of which are coated with paraffin, the coated sulphide being a smooth, dry, talclike powder.

ANDREW TOMLIN.